United States Patent [19]

Crane et al.

[11] Patent Number: 5,573,344
[45] Date of Patent: Nov. 12, 1996

[54] HIGH DAMPING COMPOSITE JOINT FOR MECHANICAL VIBRATION AND ACOUSTIC ENERGY DISSIPATION

[75] Inventors: Roger M. Crane, Arnold; Douglas C. Loup, Pasadena, both of Md.; John W. Gillespie, Jr., Hockessin, Del.; Stephen M. Andersen, Fremont, Calif.; Daniel D. Coppens, Newark, Del.

[73] Assignee: The United States of America as represented by the Secretary of the Navy, Washington, D.C.

[21] Appl. No.: 323,948

[22] Filed: Oct. 17, 1994

[51] Int. Cl.⁶ ........................................... F16L 13/10
[52] U.S. Cl. .................. 403/179; 403/268; 403/225; 403/404
[58] Field of Search ..................... 403/179, 265, 403/268, 404, 225; 273/80.4, 80.8, 80.2

[56] References Cited

U.S. PATENT DOCUMENTS

| | | | |
|---|---|---|---|
| 1,284,975 | 11/1918 | Austin | 403/268 X |
| 1,762,713 | 6/1930 | Dill | 403/268 X |
| 2,282,614 | 5/1942 | Smith | 273/80.4 |
| 3,625,513 | 12/1971 | Ballmer | 273/80.8 X |
| 3,744,782 | 7/1973 | Thomas et al. | |
| 3,786,554 | 1/1974 | Little | 403/268 X |
| 3,873,090 | 3/1975 | Thompson | 273/80.4 X |
| 3,907,446 | 9/1975 | Leslie | 403/268 |
| 3,972,634 | 8/1976 | Carmien et al. | 403/268 X |
| 4,278,726 | 7/1981 | Wieme | 428/229 |
| 4,722,717 | 2/1988 | Salzman et al. | 464/181 |
| 4,812,348 | 3/1989 | Rau | 428/113 |
| 4,863,416 | 9/1989 | Gupta | 464/181 |
| 4,902,160 | 2/1990 | Jeng | 403/268 X |
| 4,919,560 | 4/1990 | Rutledge, Jr. et al. | 403/268 |
| 4,919,876 | 4/1990 | Savage et al. | 264/258 |
| 4,923,225 | 5/1990 | Lührsen et al. | 403/268 X |
| 4,954,377 | 9/1990 | Fischer et al. | |
| 5,030,490 | 7/1991 | Bronowicki et al. | 428/36.4 |
| 5,087,491 | 2/1992 | Barrett | 428/34.5 |
| 5,108,262 | 4/1992 | Crane | |
| 5,108,802 | 4/1992 | Sattinger | 428/34.1 |
| 5,143,571 | 9/1992 | Lacoste et al. | |
| 5,201,431 | 4/1993 | Berger et al. | 403/268 X |
| 5,250,132 | 10/1993 | Lapp et al. | 156/173 |
| 5,256,223 | 10/1993 | Alberts et al. | 156/71 |
| 5,275,408 | 1/1994 | Desbiolles et al. | 273/80.4 X |
| 5,452,890 | 9/1995 | Bingman | 273/80.4 X |

OTHER PUBLICATIONS

Andersen et al "Design of an Energy Absorbing Composite Cylinder Joint for Pressure–Hull Applications" Proceedings of the American Society for Composites Eighth Technical Conference Oct. 18–21; 1993 pp. 624–639.

Primary Examiner—Terry Lee Melius
Assistant Examiner—Christopher J. Novosad
Attorney, Agent, or Firm—Howard Kaiser

[57] ABSTRACT

A design for a high damping composite joint which dissipates vibrations through the use of air gaps and viscoelastic material minimizing the transfer of vibrations to the metallic coupling. Viscoelastic material is used with adhesive to provide for increased energy dissipation by the joint. As the load increases on the joint, the load transfers from adhesive to the viscoelastic. The viscoelastic begins to take the load of the joint at the point where the adhesive becomes plastic. Acoustic vibrations are then dissipated in the viscoelastic and are prevented from being transferred to the metallic coupling by air gaps provided in the joint. The amount of viscoelastic and adhesive used depends on the anticipated load. Finite element analysis is used to calculate optimal amounts of viscoelastic and adhesive.

28 Claims, 3 Drawing Sheets

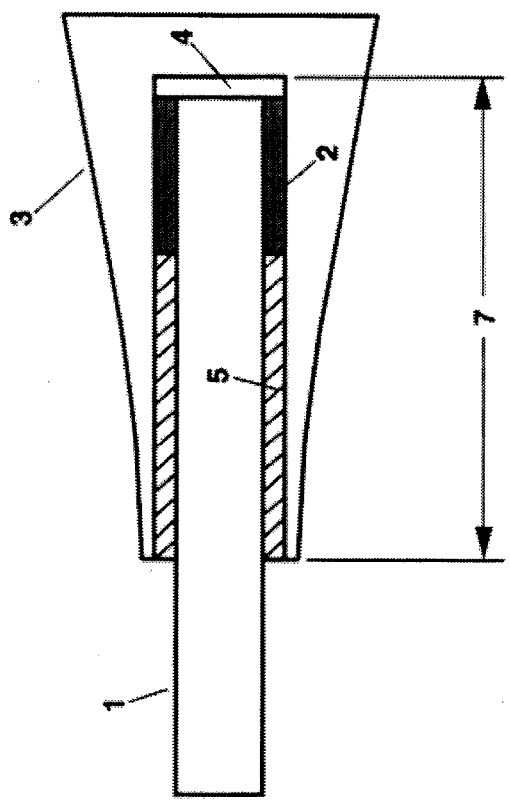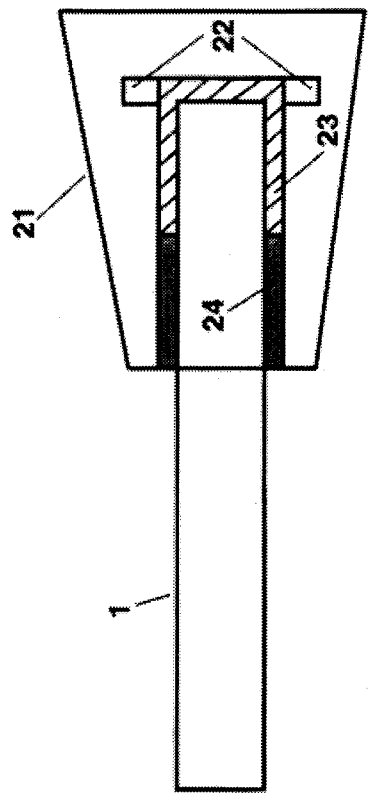

HIGH DAMPING COMPOSITE JOINT FOR MECHANICAL VIBRATION AND ACOUSTIC ENERGY DISSIPATION

The invention described herein may be manufactured and used by or for the Government of the United States of America for governmental purposes without the payment of any royalties thereon or therefor.

BACKGROUND OF THE INVENTION

1. Field of the Invention

The present invention generally relates to composite material usage for acoustic energy absorption in structural applications and, more particularly to composite to metal joints.

2. Description of the Prior Art

Previous studies have demonstrated success in design, analysis, and hydrotesting of composite cylinders for pressure hull applications. One reason for use of composites in pressure hulls is reduced acoustic signature compared to metallic hulls. To fully exploit this advantage it is necessary to consider acoustics and vibration damping when designing pressure hull joints. It is assumed that without consideration of these factors, a typical structural pressure hull joint would serve to focus and radiate acoustic energy, minimizing the advantage gained through use of composite materials.

Composite materials are seeing increased usage in structural applications. One class of forms are cylindrical sections which are being considered for underwater applications. In all cases, the composite material is adhesively bonded and/or mechanically attached to metallic couplings. These couplings are then attached to one another using a variety of methods through the metallic couplings.

Many of the potential benefits of constrained layer damping, and of the inherent material damping behavior of composites, can be lost through joining of the composite shell to a metallic joint ring. This is due to the fact that acoustic energy is focused at the joint ring, and the ring itself provides an excellent radiator of acoustic noise.

The composite to metal joint is in general designed with the sole intent of meeting the structural requirements of the application. This typically means that no provisions exist to mitigate the transfer of mechanical or acoustic energy, that may be generated in the composite, from propagating into the metallic coupling. The energy that is transferred to the metallic coupling can then be efficiently radiated into the surrounding fluid of the above mentioned applications.

Composite materials, when used for structural applications, are typically joined using metallic end fittings. Although the composite has an inherent material characteristic of high energy dissipation, the metallic coupling to which it is attached does not. These systems, then, which utilize innovative design concepts for energy dissipation by the composite, have a highly efficient nondamping component, the metallic coupling, integral to it, which results in a system which will radiate noise and vibration efficiently, thereby negating the design advantages of the composite element. This application will describe the combination of viscoelastic damper and plastically deformable adhesive to produce an energy absorbing joint which may sustain high preload.

SUMMARY OF THE INVENTION

It is therefore an object of the present invention to provide a joint with an energy dissipating mechanism to minimize vibrational energy transfer to metallic couplings. It is further an object to optimize damping at specific loads. It is also an object to provide a pressure hull joint able to absorb energy through hysteresis losses while maintaining structural integrity.

In order to achieve the above and other objects of the invention, a joint is provided such that the mechanical response of the adhesive becomes plastic at operating pressure, shifting a large portion of the load to a viscoelastic (e.g. rubber) in the joint. Note that maximum energy absorption in the joint would occur if the adhesive was "perfectly" plastic at the operating pressure minus the cyclic load, this would result in all of the cyclic load being transferred into the viscoelastic since the adhesive would effectively carry no additional load. However, this leaves the joint with little load carrying capability in the bondline above the operating pressure due to relatively low strength of the viscoelastic. It is therefore desirable to achieve maximum load transfer into the viscoelastic at the operating pressure, while still being able to carry the maximum design load through the joint by proper sizing of the structural adhesive. That is, by relating the stiffness of the adhesive and the viscoelastic within the acoustic operating window of the joint, the design can be tailored for maximum energy absorption within a given pressure range while ensuring structural integrity at higher load levels.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a cross section of a joint configuration of the present invention.

FIG. 3 is a cross section of an alternative joint configuration of the present invention.

DETAILED DESCRIPTION OF A PREFERRED EMBODIMENT OF THE INVENTION

Figure 1:
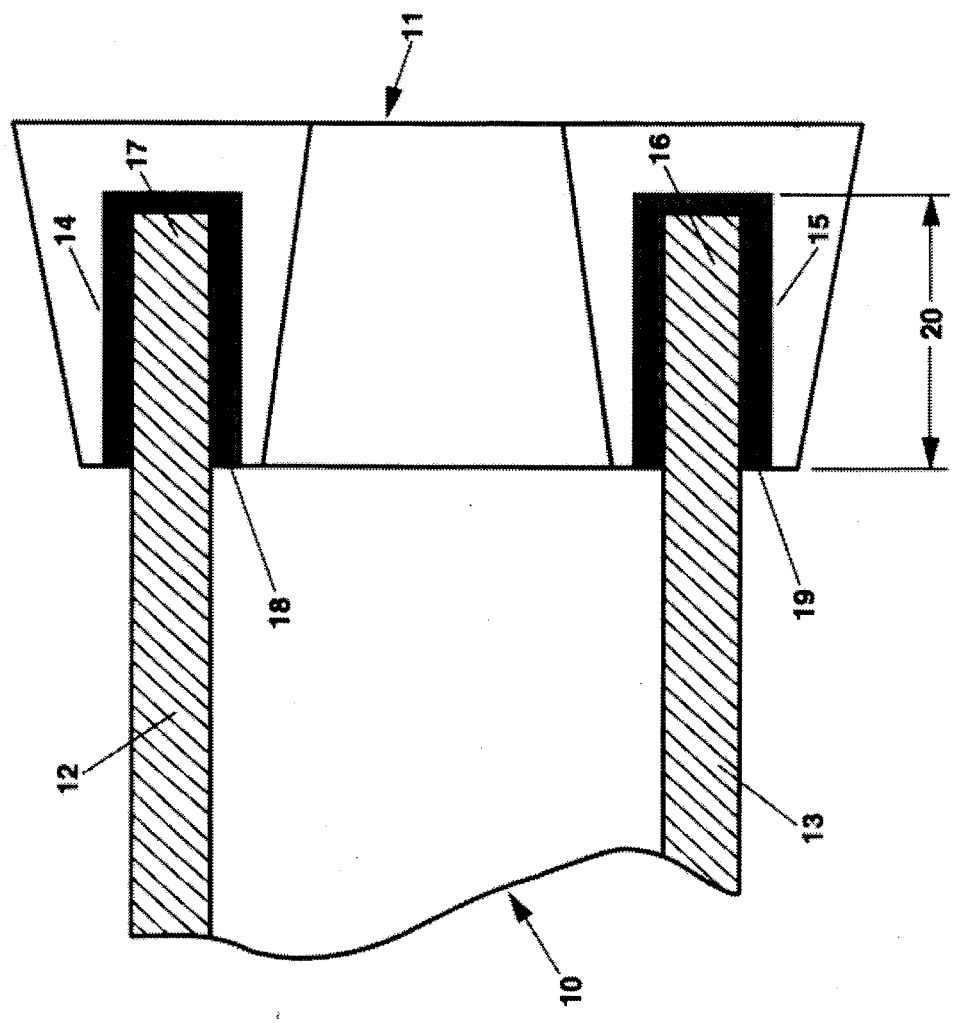
FIG. 1 is a cross section of the prior art joint configuration.

Referring now to the drawings, and more particularly to FIG. 1 which shows a cross sectional view of a typical prior art joint where for instance a hollow composite cylinder, item 10, has been joined with a metal coupler, item 11. The cylinder and metal coupling have been sliced along the long axis of the cylinder for ease of illustration. The edge portions of the sliced cylinder material are illustrated by shaded regions 12 and 13. The metal coupler has a cavity as indicated by items 14,15 formed within it for receipt of the end portion items 16,17 of the cylinder. Item 20 indicates the depth of the cavity, sometimes referred to as the transition region. The composite is secured within the cavity of the metallic coupler by adhesive as indicated in the regions 18,19. The thickness of the adhesive is greatly enlarged for purposes of illustration. As shown the adhesive typically fills all of the space between the composite and the metal forming a bondline. In these joints, a direct energy path exists from the composite structure to the metallic coupling.

For the conventional joint, as the composite 10 is subjected to hydrostatic pressure, the load is transferred to the metallic coupling 11 via shear in the adhesive and bearing at the end of the cylinder. Any mechanical or acoustic energy imparted to the composite is transferred to the metallic joint through shear and bearing. The adhesive provides little dissipation of this energy.

A first form of the high damping joint configuration of the present invention is shown in FIG. 2. Only a portion of the total joint as previously illustrated in FIG. 1 is shown for clarity. Several physical features of this joint should be noted. First, a viscoelastic material 5, such as nitrile rubber or polyurethane, has been added along the interface between the composite 1 and metallic coupling 3. The composite material 1 is also shown to not be in contact with the metallic coupling 3 on the inside of the cavity of the metallic joint. This is shown by air gap 4 between the composite 1 and the metallic coupling 3. The metallic coupling 3 is also shown to have a larger transition region, shown by item 7, which encompasses the viscoelastic material 5.

The joint in FIG. 2 exhibits superior performance in part due to reduced stresses in the composite shell. This improvement can be attributed to reduced stiffness discontinuities and the effects of handling on the bondlines respectively. Under pressure, the adhesive becomes plastic and begins to deform. In this invention the viscoelastic becomes significantly loaded at the strain where the adhesive becomes plastic. The amount of viscoelastic and adhesive 2 used depends upon the anticipated load. Finite element analysis is used to calculate optimal amounts of viscoelastic and adhesive for specific applications. More details can be found in the paper entitled "Design of an Energy Absorbing Composite Cylinder Joint for Pressure Hull Applications" by Anderson, Coppens, Gillespie, Crane and Loup which was presented at the eighth technical conference of the American Society for Composites held Oct. 19 to 21, 1993, and published in the Proceedings of the American Society for Composites. That paper is incorporated by reference into this specification.

In the study described in the paper by Anderson et al., the initial bondline thickness was chosen to be 0.050 primarily for manufacturing and assembly purposes due to the long bondline. A 3.0" bond length was chosen with 1.0" of the structural adhesive, and 2.0" of the elastomer. These values were selected to insure adequate adhesive to transfer the load, while maximizing the elastomer bond area for energy absorbtion.

Initially, a simplified axisymmetric joint model was created to vefify that as the adhesive becomes plastic, the rubber will begin to accept more of the load. This model was constructed of a 20" ID aluminum cylinder with 0.25" wall thickness, which had a 3 inch bond consisting of 1 inch adhesive and 2 inches rubber. The inner surface of this bondline was fixed axially. The aluminum was then loaded axially with a load equivalent to the 1000 psi pressure load on the pressure hull and the response of the adhesive and the rubber was predicted.

Results of the simple model indicate that as the load increases, a plastic zone develops in the adhesive and increases in length. For this particular set of materials, geometry, and loading, all of the adhesive has undergone some degree of plastic deformation at 6,000 lb/in load (equivalent to 600 psi). Up to this point the rubber supports very little load. Past the 6,000 lb/in load, the adhesive continues to deform plastically while the rubber begins the accept a larger percentage of the applied load due to the reduced stiffness of the adhesive. This is evidenced by the fact that at 6,000 lb/in, the shear stress in the majority of the rubber bondline is between 17 and 40 psi, while at 10,000 lb/in the rubber bondline is between 47 and 116 psi. This shows that a 67% increase in loading has resulted in roughly a 2000% increase in the shear stress in the rubber. The dgree of load transfer into the rubber is proportional to the adhesive modulus after yielding.

The next step in the design process was to apply the concept to a design which more closely reflected the anticipated application. An initial geometry was selected for the energy absorbing joint based on previous experience with structural joints. The design consisted of a ±54° S2-Glass/Epoxy laminate with a 9.6" internal radius and 0.3" wall thickness. The aluminum joint ring had a wall thickness of 0.9" at its thickest point. The bondline was 3.0" long with 1.0" adhesive and 2.0" rubber in a double lap (tubular) configuration. A gap was created at the butt-end of the cylinder to allow for axial motion due to deformation of the bondline, and to provide maximum stiffness mismatch at the butt end for minimum acoustic transmission into the joint. The initial thckness of the aluminum at the end of the bondline closest the center of the cylinder was 0.050" with a linear thickness increase to 0.25" at the butt end of the cylinder.

This initial joint geometry was analyzed in two different configurations: 1) with the adhesive nearest the joint ring (rubber nearest the center of the cylinder) and with the rubber nearest the joint ring (adhesive nearest the center of the cylinder).

The final axisymmetric design iteration is similar to the second with a reduction in the adhesive bondline length from 1.0" to 0.75". Also the initial thickness of the aluminum near the center of the cylinder is 0.020" with a linear thickness increase to 0.050" over 0.5 inches length. The aluminum thickness remains 0.050" along the remainder of the rubber bondline and then increases linearly to 0.25" along the adhesive bondline as in the previous designs. These changes result in a 0.080" bondline thickness at the end of the joint near the center of the cylinder which tapers to 0.050" in 0.5" of length. This provides a more gradual load introduction into the rubber and reduces shear stresses caused by the stiffness discontinuity.

In the high damping joint concept, provisions are provided for both mechanical and acoustic energy to be dissipated. This is done by the appropriate choice of the adhesive and viscoelastic. Typically, there is a specific design loading to which component will be subjected. As an example, a joint is designed to an operating pressure of 1000 psi and a collapse of 2000 psi. In this case, the type and length of the adhesive is chosen so that it becomes plastic at a pressure slightly lower, on the order of 5%, than the design operating pressure. Vibrations from both mechanical and acoustic sources will cause cyclic loads to occur in the joint region. Because of the property of the adhesive, this additional load is reacted by the viscoelastic. From the viscoelastic material characteristic, this vibrational energy is dissipated to a large extent.

The configuration is capable of dissipating both axial and flexural vibrations. In addition, since there is no connection between the end of the composite and the metal, there is no direct coupling of the axial vibration motion to the metal. This lack of contact also serves to produce an impedance mismatch between the composite cylinder and metallic coupling. The cavity is also effective for an embodiment of the invention where only adhesive is used.

As the joint loading increases to the design loading, the composite is physically displaced so that the end of the composite comes into contact with the metallic coupling. This enables the joint to survive significantly greater loads.

The present invention incorporates an energy dissipating mechanism into the joint so that vibrational energy created in the structure is not transferred to the metallic coupling, which is an efficient radiator of energy. This joint configuration can also be designed to optimize damping at specific operating loads and frequencies through the appropriate choice of viscoelastic and adhesive.

Other alternatives would incorporate the same components, the adhesive and viscoelastic in the metallic joint, but in varying amounts and locations. For example, the location of the adhesive and viscoelastic can be reversed, where the adhesive is located near the open end of the joint shown in FIG. 3. In FIG. 3, viscoelastic 23 fills the region at the back end of the metallic coupling cavity. The joint of FIG. 3 includes cavities 22 which extend radially into the metallic coupling. These cavities are intentionally left unfilled. Adhesive 24 fills the space between the composite 1 and metallic coupling 21 at the front end. The vacant cavities provide space into which the viscoelastic 23 may flow as the joint is progressively loaded. In addition, the unfilled cavities can have other shapes. For example, a tapered region can be used. Many variations of the gap can be used which, under cyclic loading, will dissipate energy. Furthermore, adhesive regions may be tapered such that there is a thinner layer of adhesive towards the back end of the joint. Tapering of the adhesive provides similar benefits to tapering the metallic couple.

Figure 4:
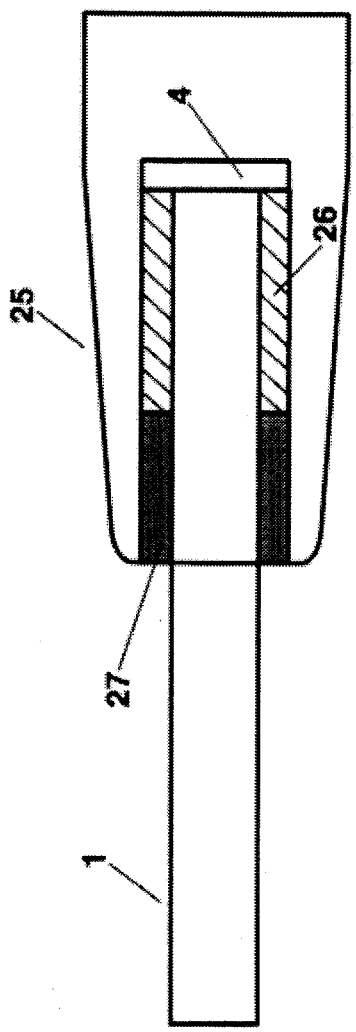
FIG. 4 is a cross section of another alternative joint configuration of the present invention.

In FIG. 4, another alternative configuration is shown. It is similar to FIG. 3 in that the adhesive 27 is at the front end of the joint and the viscoelastic 26 is at the back end of the joint and is similar to FIG. 2 in that the air gap 4 remains in the deepest part of the cavity in the metallic coupling 25.

The invention is applicable to composites in shapes other than a hollow cylinder. For instance, box beams, I-beams, channel sections, etc. could be so joined. In each instance it would require that the metallic cavity be of a shape substantially identical to the cross section of the composite to be joined. The teachings of the invention can also be used to join materials other than composites to metal or to materials other than metals, i.e metal to metal, metal to composite, wood to metal, etc.

The primary advantage of the inventive joint design is that the geometry of the joint can be tailored such that the adhesive is plastically deformed at the operating pressure. This results in a considerable stiffness reduction in the adhesive and forces the viscoelastic to take on more of the cyclic load. In addition, incorporation of an air gap between the composite shell and metallic coupling increases the shear energy storage and provides an increased impedance mismatch for mitigating energy transfer.

While the invention has been described in terms of a preferred embodiment, those skilled in the art will recognize that the invention can be practiced with modification within the spirit and scope of the appended claims.

What is claimed is:

1. A high damping joint, comprising:

a coupling having a length, a front end, a back end and a cavity, said cavity having a lengthwise side surface area and a crosswise back surface area, said cavity commencing at said front end and terminating at said crosswise back surface area;

a structural extremity fitting within said cavity so as to provide for an adjacent region and a clearance, said adjacent region being between said structural extremity and said lengthwise side surface area, said clearance being between said structural extremity and said crosswise back surface area, said clearance being shaped so as to permit displacement of said structural extremity toward said crosswise back surface area; and bonding material in said adjacent region, said adjacent region including a first segment and a second segment which are in lengthwise series, said bonding material including adhesive material and viscoelastic material, said adhesive material occupying said first segment, said viscoelastic material occupying said second segment.

2. A high damping joint as in claim 1, wherein said first segment is located nearer said crosswise back surface area and said second segment is located nearer said front end.

3. A high damping joint as in claim 2, wherein at least a portion of said adhesive material is tapered such that its thickness decreases in a direction toward said crosswise back surface area.

4. A high damping joint as in claim 1, wherein at least a portion of said length is lengthwise tapered.

5. A high damping joint as in claim 4, wherein said front end and said crosswise back surface area are selectively distanced on the basis of an anticipated range of amount of loading to which said structural extremity is to be subjected.

6. A high damping joint as in claim 1, wherein said coupling is made of a metallic material and said structural extremity is made of a composite material.

7. A high damping joint as in claim 1, wherein upon subjection of said structural extremity to anticipated loading, transferral of energy from said structural extremity to said coupling is mitigated.

8. A high damping joint as in claim 1, wherein upon subjection of said structural extremity to an amount of lengthwise loading in an anticipated range of amount of said loading, a portion of said adhesive material plastically deforms, a degree of said displacement occurs, and a portion of said loading is transferred through shear to said viscoelastic material.

9. A high damping joint as in claim 8, wherein as said structural extremity is subjected to an increasing amount of said loading, an increasing portion of said adhesive material plastically deforms and an increasing degree of said displacement occurs.

10. A high damping joint as in claim 9, wherein the degree of said displacement increases until said structural extremity contacts said crosswise back surface area.

11. A high damping joint as in claim 8, wherein said clearance increases shear energy storage in said viscoelastic material.

12. A high damping joint as in claim 8, wherein said clearance provides an impedance mismatch for mitigating energy transfer from said structural extremity to said coupling.

13. A high damping joint as in claim 8, wherein said first segment and said second segment are each selectively sized on the basis of said anticipated range of amount of said loading.

14. A high damping joint as in claim 8, wherein said cavity has a double lap configuration, said lengthwise side surface area including an inwardly facing subarea and an outwardly facing subarea, said crosswise back surface area generally defining a closed shape;

said structural extremity having an inside, an outside and a void;

said adjacent region including an inner subregion and an outer subregion;

said inner subregion being between said inside and said outwardly facing subarea;

said outer subregion being between said outside and said inwardly facing subarea.

15. A high damping joint as in claim 14, wherein said structural extremity has a shape which approximately manifests a form of symmetry with respect to an imaginary axis which is approximately oriented in the lengthwise direction.

16. A high damping joint as in claim 15, wherein said structural extremity has an approximate shape which is selected from the group of shapes consisting of cylinder and box beam.

17. A high damping joint as in claim 1, wherein said second segment is located nearer said crosswise back surface area and said first segment is located nearer said front end.

18. A high damping joint as in claim 17, wherein at least a portion of said adhesive material is tapered such that its thickness decreases in a direction toward said second segment.

19. A high damping joint as in claim 17, wherein said clearance includes an intermediate space and two laterally recessed spaces, said joint further comprising said viscoelastic material occupying said intermediate space integrally with respect to said viscoelastic material occupying said second segment.

20. A high damping joint as in claim 19, wherein as said structural extremity is subjected to an increasing amount of lengthwise loading in an anticipated range of amount of said loading, said viscoelastic material progressively flows into said two laterally recessed spaces.

21. A high damping joint, comprising:
a coupling having a length, a front end, a back end and a cavity, said cavity having a lengthwise side surface area and a crosswise back surface area, said cavity commencing at said front end and terminating at said crosswise back surface area;
a structural extremity fitting within said cavity so as to provide for an adjacent region and a clearance, said adjacent region being between said structural extremity and said lengthwise side surface area, said clearance being between said structural extremity and said crosswise back surface area, said clearance being shaped so as to permit displacement of said structural extremity toward said crosswise back surface area; and
adhesive material occupying a lengthwise segment of said adjacent region.

22. A high damping joint as in claim 21, wherein at least a portion of said adhesive material is tapered such that its thickness decreases in a direction toward said crosswise back surface area.

23. A high damping joint as in claim 21, wherein:
upon subjection of said structural extremity to an amount of lengthwise loading in an anticipated range of amount of said loading, a portion of said adhesive material plastically deforms and a degree of said displacement occurs;
as said structural extremity is subjected to an increasing amount of said loading, an increasing portion of said adhesive material plastically deforms and an increasing degree of said displacement occurs;
said clearance provides an impedence mismatch for mitigating energy transfer from said structural extremity to said coupling.

24. An energy-absorbing joint, comprising:
a coupling having a first coupling end, a second coupling end and a hole, said hole having a longitudinal hole surface area and a transverse hole surface area, said hole commencing at said first coupling end and terminating at said transverse hole surface area, said transverse hole surface area being located between said first coupling end and said second coupling end;
a member portion having a longitudinal member surface area and an end member surface area, said member portion being conformingly set within said hole whereby said longitudinal member surface area substantially abuts said longitudinal hole surface area and whereby there is a gap between said end member surface area and said transverse hole surface area, thereby permitting shearing motion of said longitudinal member surface area with respect to said longitudinal hole surface area whereby said end member surface area and said transverse hole surface area approach until being contiguous; and
a bonding layer between said longitudinal member surface area and said longitudinal hole surface area, said bonding layer including an adhesive layer division and a viscoelastic layer division, said adhesive layer division and said viscoelastic layer division being longitudinally sequential;
said adhesive layer division and said viscoelastic layer division being selectively proportioned in anticipation of a degree of longitudinal loading upon said member portion, said degree of longitudinal loading having associated therewith a degree of plastic deformation of said adhesive layer division, a degree of said shearing motion and a degree of transferral through said shearing motion of said loading to said viscoelastic layer division.

25. An energy-absorbing joint as in claim 24, wherein:
said adhesive layer division and said viscoelastic layer division are selectively proportioned in anticipation of a range of degrees of said longitudinal loading;
a threshhold degree of said longitudinal loading has associated therewith the beginning of said plastic deformation, said shearing motion and said transferral; and
increasing degrees beyond the threshold degree of said longitudinal loading have correspondingly associated therewith the occurrence of increasing degrees of said plastic deformation, said shearing motion and said transferral.

26. An energy-absorbing joint as in claim 24, wherein said adhesive layer division is located nearer said transverse hole surface area and said viscoelastic layer division is located nearer said first coupling end.

27. An energy-absorbing joint as in claim 24, wherein said viscoelastic layer division is located nearer said transverse hole surface area and said adhesive layer division is located nearer said first coupling end.

28. An energy-absorbing joint as in claim 27, further comprising viscoelastic material in said gap, said viscoelastic material adjoining said viscoelastic layer division, wherein:
said gap has two lateral indentations;
in the absence of said longitudinal loading, said viscoelastic material partially fills said gap whereby said two lateral indentations are unfilled by said viscoelastic material; and
increasing degrees of said longitudinal loading have correspondingly associated therewith the occurrence of increasing degrees of flow of said viscoelastic material into said two lateral indentations.

* * * * *